Patented Dec. 2, 1941

2,264,387

UNITED STATES PATENT OFFICE 2,264,387

COOLING FLUID WITH ANTILEAK PROPERTIES

Headlee Lamprey, Kenmore, N. Y., assignor to Carbide and Carbon Chemicals Corporation, a corporation of New York No Drawing. Application September 13, 1939, Serial No. 294,630

6 Claims. (Cl. 252—72)

The invention relates to cooling fluids containing additive materials to prevent fluid loss through leakage in circulatory cooling systems of the type employed in internal combustion engines. It includes improved leakage preventive agents of general usefulness with all known kinds of cooling fluids and solutions.

In automobile cooling systems the development of leaks is a common occurrence which may be brought on by numerous causes. Small openings, such as solder pores or minute crevices caused by imperfect union of metal parts, are often present, and even in well seamed and soldered joints crevices may develop through road shock and vibration, corrosion, or freezing of the circulating fluid. Where these breaks or leakage orifices are small, or of insufficient size to justify dismantling and repair, an attempt to remedy the situation is usually made through addition of anti-leak materials to the cooling fluid. Many compounds and mixtures have been proposed as leak sealing agents for cooling systems, but they have for the most part been only temporarily effective, have functioned properly with water only as the cooling fluid, or have been unsatisfactory for numerous other reasons.

The ideal anti-leak composition should be readily and uniformly dispersible in the cooling fluid. It should not thicken, coagulate, or be of a particle size which may cause radiator clogging, or interfere with the normal and proper circulation of the cooling fluid. Small crevice leaks, as well as pinhole or pore leaks, should be effectively stopped, and actual sealing or binder properties are desirable to insure a substantially permanent leak stoppage. Chemical inertness of the anti-leak agent is also important, particularly where it is used in the presence of corrosion inhibitors or other additive materials, and it should not destroy the function of the latter materials, or be affected in its leak sealing action by such compounds. For obvious reasons the most satisfactory anti-leak is one which is useful, and of proper function, in all common cooling fluids, particularly including anti-freeze cooling solutions composed of alcohols, glycols or glycerine, and in which the anti-leak agent may be incorporated in the freezing point depressant as a precautionary measure against possible loss by leakage when introduced into the cooling system.

It is an object of this invention to provide anti-leak compositions having all of the above enumerated requisite and desirable properties, and by the incorporation of said compositions in alcoholic freezing point depressants, further to provide improved cooling fluids which have anti-leak properties in addition to anti-freeze and non-corrosive characteristics.

I have found that alginate compounds, or salts of alginic acid, have characteristics excellently adapting them as leakage preventives in cooling fluids. These materials, in particular the alkali metal and ammonium salts, have a certain fibrous nature sufficient to clog or stop both small crevice leaks and those of a pinhole type, and through what appears to be an oxidation or thermal setting, they have a sealing action as well, and fix the fibers in the leakage orifices in a substantially permanent manner. Sodium alginate, a preferred compound for the purpose of the invention, is in pure form a colorless, odorless, and tasteless colloid, neutral in reaction, and soluble in hot or cold water. The alginates swell in water, and in small concentrations will form very viscous solutions, but the compounds are uniformly dispersible in cooling fluids entirely of water, or in those containing freezing point depressants such as alcohols, glycols or glycerine. Various alginate products are available commercially in dry powdered form or as pastes, and tests on many of these have indicated a universal effectiveness in their leak stoppage action. A product particularly satisfactory in a finely milled sodium alginate which has not been entirely purified, and may contain up to 25% of insoluble fibrous material. The insoluble component is, however, unessential to the leak sealing action of the product, and the more highly purified alginate compounds are likewise effective for the purpose of the invention.

The amount of alginate necessary in the cooling fluid to impart satisfactory anti-leak properties will vary with the particular conditions under which it is used, but for all normal purposes only very small amounts are required, preferably within the range of 0.0001% to 0.1% by weight of the cooling solution. As the essential anti-leak component, the alginates will preferably be used in preformulated compositions, either strictly for anti-leak purposes, or to impart such properties to alcoholic or other anti-freeze solutions as a precautionary protection against leakage. Both uses of the alginate are contemplated by this invention, and, in fact, the compounds have proven especially effective in monohydric and polyhydric alcohol anti-freeze cooling mixtures. Corrosion inhibitors, and other additive agents, are commonly used with these anti-freeze mixtures, but the alginates are not normally affected in their anti-leak function by such materials, nor do they usually interfere with the required action of other additive agents. In ethylene glycol, or other glycol antifreeze solutions, for example, many tests have been made employing sodium alginate in association with a variety of corrosion inhibitors, and the alginate has shown an excellent leak stoppage action in amounts varying from about 0.01% to 0.10% by weight of the glycol component.

It will be obvious that the invention is applicable to many different types and kinds of cooling solutions, and all cooling fluid compositions in which an alginate salt constitutes the essential anti-leak component is intended to be included within the scope of the invention, which should not be limited other than as defined by the appended claims.

I claim:

1. A cooling fluid containing an alcohol as a freezing point depressant and a leakage preventive agent composed essentially of an alginate, in an amount not substantially greater than 0.10% by weight of the cooling fluid.

2. A cooling fluid containing an alcohol as a freezing point depressant, a metal corrosion inhibitor, and a leakage preventive agent, said agent being composed essentially of a compound of the group consisting of alkali metal and ammonium salts of alginic acid, in an amount not substantially greater than 0.10% by weight of the cooling fluid.

3. A cooling fluid containing a glycol as a freezing point depressant, a metal corrosion inhibitor, and a leakage preventive agent, said agent being composed essentially of a compound of the group consisting of alkali metal and ammonium salts of alginic acid, in an amount of about 0.01% to about 0.10% by weight of the glycol.

4. A cooling fluid containing ethylene glycol as a freezing point depressant, a metal corrosion inhibitor, and a leakage preventive agent, said agent being composed essentially of sodium alginate in an amount of about 0.01% to about 0.10% by weight of the ethylene glycol.

5. Method of preventing leakage of cooling fluid in a circulatory cooling system which comprises circulating said cooling fluid with an admixture thereto of an anti-leak agent composed essentially of a compound of the group consisting of alkali metal and ammonium salts of alginic acid, in an amount not substantially greater than 0.10% by weight of the cooling fluid.

6. Method of preventing leakage of cooling fluid in a circulatory cooling system which comprises circulating said cooling fluid with an admixture thereto of an anti-leak agent composed essentially of sodium alginate, in an amount of about 0.01% to about 0.10% by weight of the cooling fluid.

HEADLEE LAMPREY.